Jan. 22, 1935.  G. W. EMRICK  1,988,967
CLUTCH DEVICE
Filed May 5, 1934
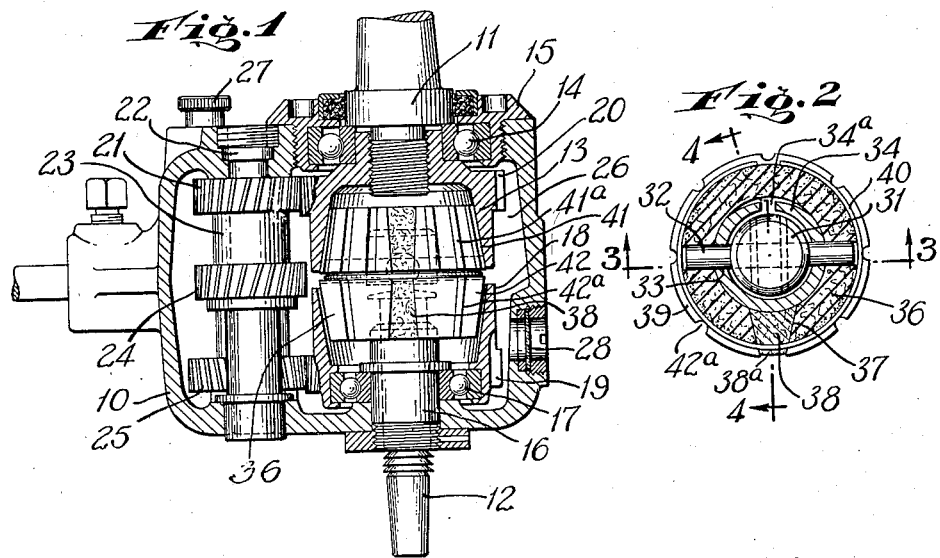
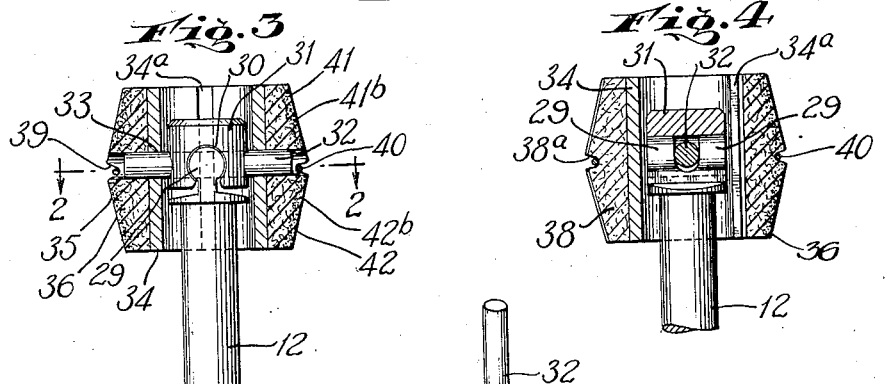
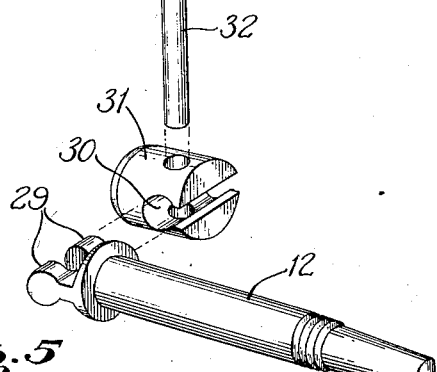
INVENTOR
GEORGE W. EMRICK
BY
Howard E. Thompson
ATTORNEY Patented Jan. 22, 1935

1,988,967

UNITED STATES PATENT OFFICE 1,988,967

CLUTCH DEVICE

George W. Emrick, Brooklyn, N. Y.

Application May 5, 1934, Serial No. 724,109

19 Claims.  (Cl. 192—21)

This invention relates to clutch devices and particularly to clutches of what are known as tapping attachments; and the object of the invention is to provide a clutch of the class described with a clutch head so constructed as to provide for flexible action of the head and to permit collapsing or expansion and contraction thereof when the head is in use to insure a frictional drive of the member to be driven by the clutch under the required or prevailing loads and yet permit slippage between the head and the clutch sleeve or shell to eliminate breakage of the tapping attachment or parts thereof, as well as injury to the tap or other tool actuated by the clutch; a further object being to provide a clutch of the class described with a clutch facing of specially prepared and treated material to render the same efficient in use in accomplishing the desired results, and especially when the clutch is lubricated or running in a bath of oil; a further object being to provide means for universally mounting the clutch head upon the spindle to centralize the head in the driving members to provide proper alinement of the tap spindle and permit self-centering of the tap supported on the spindle with respect to the workpiece; a further object being to provide a clutch head in the form of a split ring or sleeve capable of expansion and contraction with tensional means in the form of a split spring tube for supporting the split friction sleeve and for normally exerting outward pressure on said sleeve; and with these and other objects in view, the invention consists in a clutch device of the class and for the purpose specified, which is simple in construction and operation and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a sectional view through a tapping attachment showing one of my improved clutch devices therein and indicating the manner of its use.

Fig. 2 is a sectional plan view of the clutch detached, the section being on the line 2—2 of Fig. 3.

Fig. 3 is a section on the line 3—3 of Fig. 2.

Fig. 4 is a section on the line 4—4 of Fig. 2; and,

Fig. 5 is a perspective view of parts of the construction shown in Figs. 2 to 4 inclusive detached.

For the purpose of illustrating one use of my invention or one method of carrying it into effect, I have indicated in Fig. 1 of the drawing a tapping attachment consisting of a casing 10 in which is mounted a drive spindle 11 and a driven spindle 12, to the latter of which a tap or other tool may be coupled by a chuck, not shown, in the usual manner. Coupled with the spindle 11 is a drive clutch sleeve or shell 13 which is mounted in a ball bearing 14 supported in a cap 15, the cap being detachable with respect to the casing. The cap 15 facilitates the removal of the shell 13 as well as other parts of the attachment from the casing for repair, replacement and other purposes.

The driven spindle is mounted in a bushing 16 detachable with respect to the bottom of the casing 10 and around the bushing is a ball bearing 17 upon which is rotatably mounted a reverse drive clutch sleeve or shell 18. The shell 18 has a gear face 19 thereon and the shell 13 a gear face 20, the latter meshing with a gear 21 on a pin or shaft 22 having bearings in the top and bottom walls of the casing 10, the gear 21 having an extending sleeve 23 with another gear 24 at the lower end thereof, the latter meshing with a gear directly in back of the gear 24 and on another pin or shaft disposed in alinement with the pin or shaft 21. On the second pin or shaft is another gear 25 which meshes with the gear 19 on the shell 18 to provide the reverse drive, as will be apparent. This entire structure is more or less diagrammatically here illustrated merely to disclose one use of my improved clutch, and the structure of the tapping attachment as a whole forms the subject matter of a separate application filed May 17, 1934 and bearing Serial Number 726,107, it being understood in this respect that my present invention is not necessarily limited to the particular tapping attachment herein shown and described.

It will be noted that the structure of the casing and the mounting of the several parts therein provides within the casing a substantially sealed chamber 26, into which lubricating oil may be placed through a suitable inlet indicated at 27 preferably to bring the oil centrally of a window or gage 28 mounted in one side wall of the casing so that the entire mechanism of the attachment, including the clutch device and the bearings of the working parts may be thoroughly lubricated. This is especially important in operating devices of this class at high speed.

The spindle 12, in the construction shown, has at its inner or upper end an enlarged head fashioned to form two cylindrical bearings 29 which are adapted to seat and rotate to a slight degree in a transverse bore 30 formed in a universal joint cylinder body 31, said body having a pin 32 passing therethrough at right angles to the bearings 29 and positioned between said bearings loosely to provide longitudinal movement of the bearings 29 in the bore 30. The body 31 is rotatably mounted on the pin 32 as well as being capable of movement longitudinally thereof. The ends of the pin 32 project beyond the body 31 and extend through apertures 33 in a split sleeve or liner 34 composed of spring material and through opposed apertures 35 in a tubular clutch head 36. The clutch head 36 is split or subdivided as indicated at 37, the latter being arranged in an opposed relation with respect to the split 34a of the sleeve 34 as clearly seen in Fig. 2 of the drawing. In the split 37 is disposed a pad or wick 38 of suitable cushioning and absorbent material, such for example as felt. This pad, in addition to permitting the expansion and contraction of the head 36 provides means for feeding oil from the lower end of the casing to both surfaces of the sleeves 13 and 18 in the operation of the clutch to insure the supply of lubricant to the surfaces of said head. The central portion of the tubular head 36 has a circumferential groove 39 which extends through the pad 38 as seen at 38a, Fig. 4. In this groove is arranged a split or spring ring 40 which serves to hold the pad 38 in position and also to retain the pin 32 against displacement from the head 36.

The outer surface of the head 36 is tapered upwardly at the top thereof to form a beveled seating surface 41 and the lower portion thereof is tapered downwardly to form another beveled surface 42. Both of these surfaces are provided with vertical grooves 41a and 42a respectively which reduce the friction engaging surface of said beveled portions and also provide for the transmission of the lubricating oil onto said surfaces as well as the surfaces of the shells 13 and 18, as well as to remove by scraping action any surplus of oil that may be deposited on the surfaces of the shells 13 and 18, as will be apparent.

By reason of the universal mounting of the head 36 upon the spindle 12, said head is capable of horizontal sliding movement in all radial directions to center the head within either of the beveled surfaces of the shells 13 and 18 as well as to bring the surfaces into proper alinement with each other for producing the friction drive by virtue of the rocking universal movement contributed to the head through the universal support therefor on the spindle.

Any suitable type of material may be employed in the tubular friction head 36, but it is preferred that the clutch head be constructed of asbestos or similar fibrous material impregnated with a thermoplastic or similar material or a thermo setting type of phenol condensating resin, or if desired, an asbestos paper tube may be employed and so impregnated.

To produce the desired friction surface on the beveled surfaces 41, 42 of said head, said surfaces are subjected to a heating means of relatively high temperature, sufficiently to carbonize or substantially carbonize the thermo-plastic or similar material, thus providing relatively hard treated surfaces 41b and 42b as is indicated by the stippling shown in Fig. 3 of the drawing, which will permit the use of the clutch efficiently at high speeds without any possible danger of sticking or faulty operation by reason of any excessive heat that may prevail, and at the same time, provide frictional surfaces which will permit the use of a lubricating oil thereon without destroying the required frictional engagement to meet the normal or maximum load requirements of the clutch, it being understood in this connection, however, that the desired slippage is provided to eliminate breakage in the event that the tap or tool should be caused to jam or bind for uncontrollable reasons.

By reason of the split structure of the clutch head 36 and the split supporting spring sleeve or tube, the clutch is maintained in tensional engagement with the surfaces of the shells 13 and 18, the head 36 being capable of inward and outward circumferential flexure or expansion and contraction to accomplish this result. The clutch head 36 and the method of its construction constitute the subject matter of a companion application filed May 5, 1934 and bearing Serial Number 724,110.

In this connection, it will be understood that while the type of clutch head above described is preferred, my invention is not necessarily limited to the use thereof as other types of materials may be employed in conjunction with my improved clutch construction. Various other changes in and modifications of the construction herein shown and described may be made within the scope of the appended claims without departing from the spirit of my invention or sacrificing its advantages.

Having fully described my invention, what I claim as new and desire to secure by Letters Patent, is:

1. A clutch device comprising a tubular clutch head of frictional material, a spindle extending into said head and means for mounting the head in connection with the spindle to provide universal movement of the spindle and head one with respect to the other, said tubular head being split longitudinally thereof to provide expansion and contraction of the head.

2. A clutch device comprising a tubular clutch head of frictional material, a spindle extending into said head, means for mounting the head in connection with the spindle to provide universal movement of the spindle and head one with respect to the other, said tubular head being split longitudinally thereof to provide expansion and contraction of the head, and tensional means within said tube for supporting the same in a normally expanded position.

3. A clutch device comprising a tubular clutch head of frictional material, a spindle extending into said head, means for mounting the head in connection with the spindle to provide universal movement of the spindle and head one with respect to the other, said tubular head being split longitudinally thereof to provide expansion and contraction of the head, tensional means within said head for supporting the same in a normally expanded position, and said head having a beveled frictional surface for engagement with a driven member.

4. A clutch device comprising a tubular clutch head of frictional material, a spindle extending into said head, means for mounting the head in connection with the spindle to provide universal movement of the spindle and head one with respect to the other, said tubular head being split longitudinally thereof to provide expansion and contraction of the head, tensional means within said head for supporting the same in a normally expanded position, said head having a beveled frictional surface for engagement with a driven member, and said beveled surface having grooves spaced circumferentially thereon.

5. A frictional clutch for placing a drive member in operative engagement with a member to be driven, said clutch comprising a split tubular body of frictional material, and a split spring tube within said tubular body for supporting the same in normally extended position and permitting contraction of said body against the action of said spring tube.

6. A frictional clutch for placing a drive member in operative engagement with a member to be driven, said clutch comprising a split tubular body of frictional material, tensional means within said tubular body for supporting the same in normally extended position and permitting contraction of said body against the action of said tensional means, the frictional surface of said tubular body being grooved, and a pad of cushioning material disposed between the split ends of said body.

7. A frictional clutch for placing a drive member in operative engagement with a member to be driven, said clutch comprising a split tubular body of frictional material, a split spring tube within said tubuluar body for supporting the same in normally extended position and permitting contraction of said body against the action of said spring tube, and means for universally mounting said body in connection with the driven member to provide self-alinement and seating of the tubular body in connection with the drive member.

8. A frictional clutch for placing a drive member in operative engagement with a member to be driven, said clutch comprising a split tubular body of frictional material, tensional means within said tubular body for supporting the same in normally extended position and permitting contraction of said body against the action of said tensional means, means for universally mounting said body in connection with the driven member to provide self-alinement and seating of the tubular body in connection with the drive member and said last named means comprising a coupling part in connection with which the driven member is slidably and rotatably mounted and a pin traversing said body and upon which said coupling part is rotatably and slidably mounted.

9. A frictional clutch for placing a drive member in operative engagement with a member to be driven, said clutch comprising a split tubular body of frictional material, tensional means within said tubular body for supporting the same in normally extended position and permitting contraction of said body against the action of said tensional means, means for universally mounting said body in connection with the driven member to provide self-alinement and seating of the tubular body in connection with the drive member, said last named means comprising a coupling part in connection with which the driven member is slidably and rotatably mounted and a pin traversing said body and upon which said coupling part is rotatably and slidably mounted, said tensional means including a split tube of spring material forming a liner for said tubular body, and means for retaining said pin against accidental displacement from said body.

10. A clutch of the class described comprising a tubular clutch body having two beveled clutch surfaces tapering to opposed ends of said body, means within said body for universally mounting the same in connection with a member to be driven thereby, said body being split longitudinally thereof to provide expansion and contraction of said body, and a split spring tube forming a liner for said body with the split thereof disposed in spaced relation to the split in said body.

11. A clutch of the class described comprising a tubular clutch body having two beveled clutch surfaces tapering to opposed ends of said body, means within said body for universally mounting the same in connection with a member to be driven thereby, said body being split longitudinally thereof to provide expansion and contraction of said body, a split spring tube forming a liner for said body with the split thereof disposed in spaced relation to the split in said body, the universal coupling with said body comprising a pin traversing the body at a point at right angles to the split therein and in said liner tube, and a spring ring for retaining said pin against displacement from said body.

12. A clutch of the class described comprising a tubular clutch body having two beveled clutch surfaces tapering to opposed ends of said body, means within said body for universally mounting the same in connection with a member to be driven thereby, said body being split longitudinally thereof to provide expansion and contraction of said body, a split spring tube forming a liner for said body with the split thereof disposed in spaced relation to the split in said body, the universal coupling with said body comprising a pin traversing the body at a point at right angles to the split therein and in said liner tube, a spring ring for retaining said pin against displacement from said body, a pad of cushioning material disposed between the split ends of said tubular body and the beveled friction surfaces of said body being grooved.

13. A friction clutch for placing a drive member in operative engagement with a member to be driven, said clutch comprising a friction body composed of a fibrous material impregnated with a thermosetting substance treated to substantially carbonize the outer surface of the body to form a relatively hard heat resisting friction surface in connection with which a lubricating oil may be used without destroying the friction properties of said surface, said friction surface being grooved, and means for universally supporting said body in connection with the driven member.

14. A friction clutch for placing a drive member in operative engagement with a member to be driven, said clutch comprising a friction body composed of asbestos impregnated with a thermosetting substance treated to substantially carbonize the outer surface of the body to form a relatively hard heat resisting friction surface in connection with which a lubricating oil may be used without destroying the friction properties of said surface, said friction surface being grooved, means for universally supporting said body in connection with the driven member, said body being in the form of a tube split longitudinally thereof, and a split sleeve of spring material in the bore of said body.

15. In a tapping attachment having forward and reverse drive clutch sleeves disposed adjacent each other, a clutch member consisting of a tubular clutch body having beveled clutch surfaces disposed within said sleeves, said clutch body being in the form of a split tube, tensional means within said body to support the same in engagement with either of said clutch sleeves under predetermined loads, and means for universally supporting said clutch body upon a driven member to centralize said body with respect to said member and clutch sleeves.

16. In a device of the class described, a casing, a drive member in said casing, a driven member in said casing and the casing containing lubricating oil for supply to said members, a clutch body for placing the drive member in operative engagement with the member to be driven, and a wick element for transmitting lubricating oil from the casing to the engaging surface of said clutch body.

17. In a device of the class described, a casing, a drive member in said casing, a driven member in said casing and the casing containing lubricating oil for supply to said members, a clutch body for placing the drive member in operative engagement with the member to be driven, a wick element for transmitting lubricating oil from the casing to the engaging surface of said clutch body, said driving member and driven member having beveled clutch surfaces within the casing, and said clutch body having two conical ends engaging the beveled surfaces of said members, and said wick extending to both of said conical surfaces.

18. In a device of the class described, a casing, a drive member in said casing, a driven member in said casing and the casing containing lubricating oil for supply to said members, a clutch body for placing the drive member in operative engagement with the member to be driven, a wick element for transmitting lubricating oil from the casing to the engaging surface of said clutch body, said clutch body being split and the wick being disposed in the split of said body.

19. A clutch of the class described comprising a tubular clutch body split to render the same resilient and having two bevelled clutch surfaces tapering to opposite ends of said body, said body being composed of treated fibrous material, and means within said body for universally mounting the same in connection with a member to be driven thereby.

GEORGE W. EMRICK.